United States Patent [19]
Abe

[11] Patent Number: 5,471,325
[45] Date of Patent: Nov. 28, 1995

[54] STORING CODED COLOR COMPONENTS OF CODED INPUT IMAGE AND CODED IMAGE DATA RECEIVED FROM A TRANSMISSION LINE

[75] Inventor: Shunichi Abe, Kawasaki, Japan

[73] Assignee: Canon Kabushiki Kaisha, Tokyo, Japan

[21] Appl. No.: 84,087

[22] Filed: Jun. 28, 1993

Related U.S. Application Data

[60] Continuation of Ser. No. 796,875, Nov. 25, 1991, abandoned, which is a division of Ser. No. 538,730, Jun. 15, 1990, abandoned, which is a continuation of Ser. No. 271,362, Nov. 14, 1988, Pat. No. 4,953,012, which is a continuation of Ser. No. 180,640, Apr. 6, 1988, abandoned, which is a continuation of Ser. No. 73,873, Jul. 15, 1987, abandoned, which is a continuation of Ser. No. 585,233, Mar. 1, 1984, abandoned.

[30] Foreign Application Priority Data

| Mar. 8, 1983 | [JP] | Japan | 58-37712 |
| Mar. 17, 1983 | [JP] | Japan | 58-44992 |
| Mar. 17, 1983 | [JP] | Japan | 58-44993 |

[51] Int. Cl.⁶ ........................ H04N 1/46
[52] U.S. Cl. ........................ 358/524; 358/539
[58] Field of Search ........................ 358/426, 429, 358/450, 462, 467, 470, 524, 537, 539, 540, 500, 442; 382/56; H04N 1/40, 1/46

[56] References Cited

U.S. PATENT DOCUMENTS

| 3,752,912 | 8/1973 | Ohsawa et al. | 178/6 |
| 3,828,319 | 8/1974 | Owen et al. | 340/172.5 |
| 3,956,583 | 5/1976 | Pugsley | 178/6.6 R |
| 4,206,475 | 6/1980 | Taudt et al. | 358/78 |
| 4,251,837 | 2/1981 | Janeway, III | 358/280 |
| 4,413,287 | 11/1983 | Torpie et al. | 358/288 |
| 4,476,486 | 10/1984 | Ayata et al. | 358/78 |
| 4,496,989 | 1/1985 | Hirosawa | 358/296 |
| 4,587,633 | 5/1986 | Wang et al. | 364/900 |
| 4,625,234 | 11/1986 | Yamada | 358/78 |
| 4,647,923 | 3/1987 | Carleton, Jr. | 340/723 |
| 4,750,212 | 6/1988 | Yokomizo | 382/56 |
| 4,819,063 | 4/1989 | Sugiura et al. | 358/75 |
| 4,953,012 | 8/1990 | Abe | 358/75 |

FOREIGN PATENT DOCUMENTS

| 0031418 | 7/1981 | European Pat. Off. | 358/462 |
| 0038497 | 10/1981 | European Pat. Off. | G03G 13/26 |
| 2906073 | 8/1979 | Germany | H04N 1/20 |
| 54-118722 | 9/1979 | Japan | 358/75 |
| 56-144668 | 11/1981 | Japan | H04N 1/46 |
| 57-4661 | 1/1982 | Japan | H04N 1/46 |
| 57-38055 | 3/1982 | Japan | H04N 1/00 |
| 57-127361 | 8/1982 | Japan | H04N 1/32 |
| 58-9462 | 1/1983 | Japan | 358/280 |
| 2015304 | 9/1979 | United Kingdom | H04M 11/00 |
| 2082014 | 2/1982 | United Kingdom | 358/462 |
| 2087683 | 5/1982 | United Kingdom | H04N 1/40 |
| 2102240 | 1/1983 | United Kingdom | 358/75 |

OTHER PUBLICATIONS

D. Hedgeland, "Laser Typesetting—Text and Pictures," *Technical Association Of The Graphic Arts*, pp. 31–47, 1982.

S. A'hearn, "Computer Synthesis of Halftones: The Keystone of Prepress Automation", *Technical Association Of The Graphis Arts*, pp. 292–301, 1981.

Primary Examiner—Leo H. Boudreau
Assistant Examiner—Andrew W. Johns
Attorney, Agent, or Firm—Fitzpatrick, Cella, Harper & Scinto

[57] ABSTRACT

An image processing apparatus receives compressed color image data and/or non-compressed color image data for each pixel and discriminates whether the received color image data is compressed or non-compressed color image data. The received color image data is processed and outputted. The color image data may be processed so that compressed image color data is expanded when the received color image data is discriminated as compressed color image data and is half-tone processed when the received color image data is discriminated as non-compressed color image data. The received color image data may be stored in a common memory represented by the same kind of plural color components and the frame data format of the compressed image data may be converted.

3 Claims, 12 Drawing Sheets

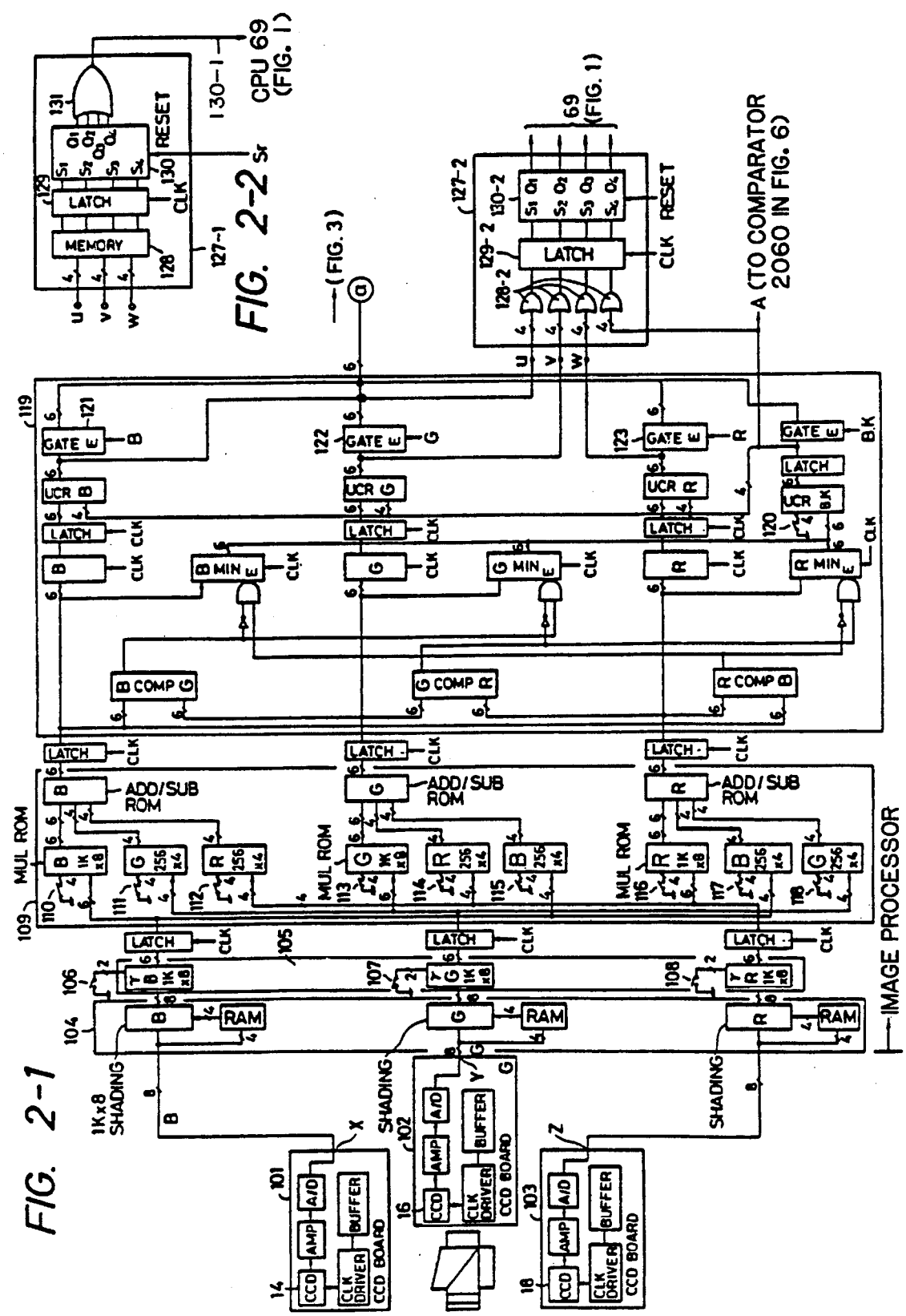

STORING CODED COLOR COMPONENTS OF CODED INPUT IMAGE AND CODED IMAGE DATA RECEIVED FROM A TRANSMISSION LINE

This application is a continuation of application Ser. No. 07/796,875 filed Nov. 25, 1991, abandoned, which was a division of application Ser. No. 07/538,730 filed Jun. 15, 1990, abandoned, which was a continuation of application Ser. No. 07/271,362 filed Nov. 14, 1988, now U.S. Pat. No. 4,953,012, which was a continuation of application Ser. No. 07/180,640 filed Apr. 6, 1988, abandoned, which was a continuation of application Ser. No. 07/073,873 filed Jul. 15, 1987, abandoned, which was a continuation of application Ser. No. 06/585,233 filed Mar. 1, 1984, abandoned.

BACKGROUND OF THE INVENTION

1. Field of the Invention

The present invention relates to an image processing system.

2. Description of the Prior Art

An apparatus which optically reads an image of a document with a photosensor, converts it to an electrical signal, processes the signal and prints it out has been known.

When characters comprising data are to be printed, it is necessary to read the document image while a transparent sheet bearing the data characters is overlayed on the document. This is a very inconvenient method.

On the other hand it may be possible to electrically generate a character signal and combine it with a document image signal, but the resolving power for the inserted characters is lowered when the document image includes a half-tone image. Further, when the document image including a color image is reproduced, the inserted characters are sometimes not clearly reproduced depending on a background.

A binarizing processing method such as a dither method for reproducing gray levels of the document image has been known. It reproduces n×m gray levels with n×m pixels. As a result, the resolving power is lowered by a factor of n×m. Accordingly, the line image of characters included in the document may be unclear or combined characters may be unclear.

An apparatus which exposes a document image to an electrophotographic drum through an optical system and irradiates the drum with a laser beam modulated by a character signal to combine the document image and the character image has been known. However, this system is complex.

An apparatus which stores image data and other image data to be combined with the image data is also known. However, a long time is required to combine these types of data.

In a conventional color copying machine which uses a photosensitive medium or a laser beam color printer, a yellow or blue toner image is formed on the photosensitive medium, and transferred to a record paper. Then a magenta or green toner image is formed and transferred on the record paper. Next a cyan or red toner image is formed and transferred. And finally a black toner image is formed and transferred on the record paper. As a result, four color cycles are repeated even if a document includes only one color and hence the time required for such conventional processing is large.

SUMMARY OF THE INVENTION

It is an object of the present invention to provide an image processing system which allows addition of a character image to an image including gray or half-tone level or image portion without deteriorating image quality.

It is another object of the present invention to provide an image processing system which allows real-time addition of a character image such as management data to an optically read image including a gray or half-tone level without deteriorating image quality.

It is another object of the present invention to provide an image processing system which processes a gray level of a read image signal without deteriorating the resolving power of a character image included in the read image and a character image to be added, to produce a combined digital image signal.

It is another object of the present invention to provide an image processing system which allows the addition of a character image to any position in an image including a gray level without deteriorating image quality.

It is another object of the present invention to provide an image processing system which combines a color image including a gray level with a character image without deteriorating image quality.

It is another object of the present invention to provide an image processing system which combines a first image with a second image while preventing a combined image from becoming unclear because of an image condition of the combined area of the first image.

It is another object of the present invention to provide an image processing system which combines a read image and another image without taking a long combination processing time and prints out the combined image.

It is another object of the present invention to provide a color image printing system which real time reproduces a half-tone level of a color image without deteriorating the resolving power of the color image.

It is another object of the present invention to provide an image printing system which reproduces a color image including color components or a monochromatic image in a short time.

The above and other objects of the present invention will be apparent from the following description of the invention.

BRIEF DESCRIPTION OF THE DRAWINGS

FIGS. 2-1, 2-2, 2-3, 3-1, 3-2, 5 and 6 show circuit diagrams of an image processor, FIGS. 4-1 to 4-3 show flow charts for black discrimination, monochromatic discrimination and half-tone discrimination, respectively.

DETAILED DESCRIPTION OF THE PREFERRED EMBODIMENTS

Figure 1:
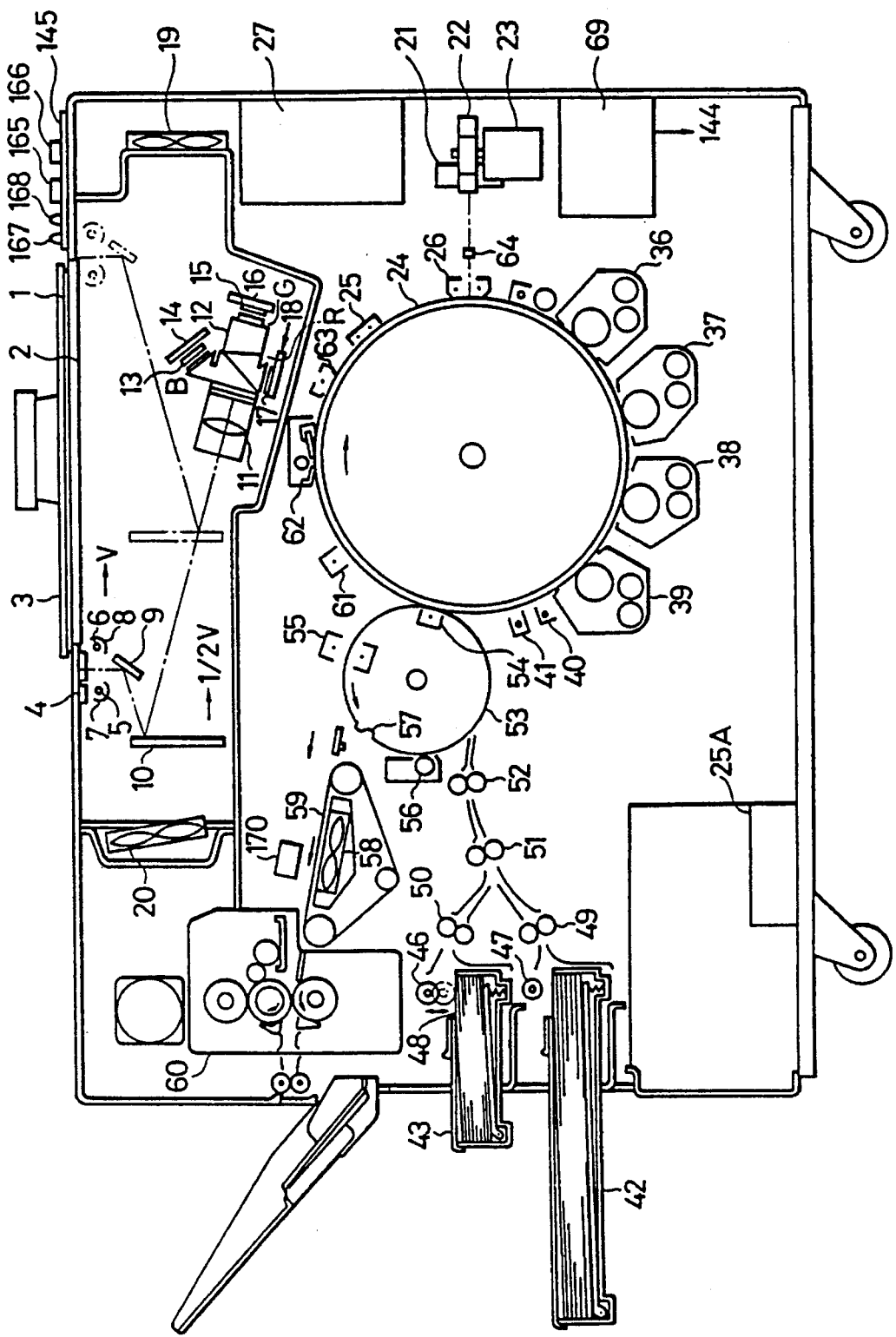
FIG. 1 shows a sectional view of a color copying machine in accordance with the present invention.

FIG. 1 shows an embodiment of an image processing system in accordance with the present invention, which reads a color document to reproduce a color image.

An original document 1 is placed on a transparent plate 2 of an original document platform and held in place by an original document mat 3. A photosensitive drum 24 and a transfer drum 53 are rotated in the directions of the arrows to carry out color processing. Numeral 12 denotes a color separating prism and numerals 14, 16 and 18 denote a first input device comprising CCD's which sense spectra to produce color signals B, G and R. Lamps 5 and 6, reflection mirrors 7 and 8 and mirrors 9 and 10 reciprocate to scan the original document 1 while the CCD's produce the color signals B, G and R, to produce a reproducing signal Y. Cooling fans are indicated at 19 and 20. Components for clearing the drum 24 of charge and cleaning residual toner from it include units 61, 62, and 63. A control unit 145 includes various control buttons or keys 165 and 166 and indicator lamps 167 and 168.

Then, they reciprocate to produce a signal M. The above step is repeated four times to sequentially produce the signals Y, M, C and BK. A laser is controlled by those signals to sequentially form latent images of respective colors on the drum 24. The latent images of the respective colors are sequentially developed by developing units 36–39 and the developed images are successively transferred on a paper on a transfer drum 53 during four revolutions of the drum 53. In this manner, a full color copy having half-tone levels and intermediate colors is produced.

The optical system emits light from illumination lamps 5 and 6 and the lights are combined with lights from reflection mirrors 7 and 8 and a combined light is incident on the original document. A reflection light therefrom is reflected by moving reflection mirrors 9 and 10, transmitted through lens 11 and passes through the color separating prism. The light is decomposed to a blue light, a green light and a red light. Of those lights, the blue light passes through the blue filter 13 and is sensed by a solid-state image pickup device 14. Similarly, the green light passes through the green filter 15 and is sensed by a solid-state image pickup device 16, and the red light passes through the red filter 17 and is sensed by a solid-state image pickup device 18. Thus, the original document 1 is scanned by the moving reflection mirror 9 which is moved with the illumination lamps 5 and 6 and the moving reflection mirror 10 which is moved at one half of the velocity ((½)V) of the moving reflection mirror 9 in the same direction, with an optical path length being maintained constant, and the image lights scanned and color-decomposed through the lens 11 and the color separating prism 12 are focused on the solid-state image pickup devices 14, 18 and 16 for the respective colors. The outputs from the solid-state image pickup devices 14, 16 and 18 are processed by an image processor 27, an output of which is supplied to a semiconductor laser 21, which in turn directs a light beam output to a polygonal mirror 22 to irradiate the photosensitive drum 24. Since the polygonal mirror 22 is rotated by a scanner motor 23, the laser beam is scanned perpendicularly with respect to the direction of rotation of the photosensitive drum 24. A photosensor 64 is positioned 11 mm in front of a start position of laser beam scan on the drum. When the laser beam is incident on the photosensor 64, it produces a beam detect signal BD. The signal BD determines a write timing of one line by the laser beam and also determines an output timing of one line of image data of a line memory.

The photosensitive drum 24 is charged negatively by a negative charger 25 to which a negative high voltage is supplied from a high voltage supply 25A. The original document 1 on the transparent plate 2 of the original document platform is illuminated by the illumination lamps 5 and 6, and the image light is directed to the color separating prism 12 through the moving reflection mirrors 9 and 10 and is the lens 11 and decomposed by the blue filter 13, the green filter 15 and the red filter 17, and the decomposed lights are focused on the solid-state image pickup devices (CCD's) 14, 16 and 18. The image outputs from the CCD's are supplied to the image processor 27 of FIGS. 2-1, 2-2, and 3-1, in which the signals are processed by a shading unit 104 and a γ-correction unit 105 to correct the tonality, processed by a masking processing unit 109 and a UCR processing unit 119 to process color signals, processed by a dither processing unit 124 and a multi-level processing unit 125 to reproduce gray levels. An output signal from a laser driver unit 126 is supplied to the laser 21 so that the laser beam is focused on the photosensitive drum 24. The electrostatic latent images are formed thereon and developed by four developing units 36, 37, 38 and 39 for the respective colors. The image is decomposed to three color images in each exposure scan and the UCR outputs for B, G, R and BK are sequentially selected in each scan. One color signal in the image processing unit 27 is selected by a timing signal (signal E to each gate 121, 122 and 123 corresponding to each UCR output) from the control unit 69 so that the corresponding developing unit is selected. The selected developing unit develops the image by a powder developing method using a magnetic blade to visualize the electrostatic latent image. Then, the negatively charged electrostatic latent image is erased by a ghost lamp 40 for erasing the electrostatic latent image and a negative post electrode 41 connected to the high-voltage power supply 25A, all shown in FIG. 1.

As shown in FIG. 1, a record paper 48 fed from one of upper and lower cassettes 43 and 42 selected by a control unit 145 through paper feed rollers 46 and 47 goes through first upper and lower registration rollers 50 and 49, a conveyor roller 51 and a second registration roller 52 and is wrapped around a transfer drum 53. The toner on the photosensitive drum 24 is transferred to the record paper 48 by a transfer electrode 54. After the transfer, the photosensitive drum 24 is discharged by the high voltage power supply 25A and the record paper 48 is discharged by a discharge electrode 55 to which a high voltage is applied. In this manner, the print operation is carried out substantially simultaneously with the document scan, and hence the print time is reduced.

For the color original document, the above operation is usually repeated four times for each of the four colors so that the transfer drum is rotated four times and the images of the respective colors are superimposed. If the original document includes only a black color, it is detected at the end of one run of the optical system and the scan, develop and transfer processes for G and R are omitted and the copy operation for the black image is started. Thus, four operation cycles are required for the color document while only one or two operation cycles are required for the black-only document.

After two or four transfer cycles, the record paper 48 is separated from a gripper 57 and attracted to a belt 59 by a conveyor fan 58, conveyed to a fixing unit 60 where the image is fixed. Then, the record paper is fed out of the machine.

Figures 1, 3:
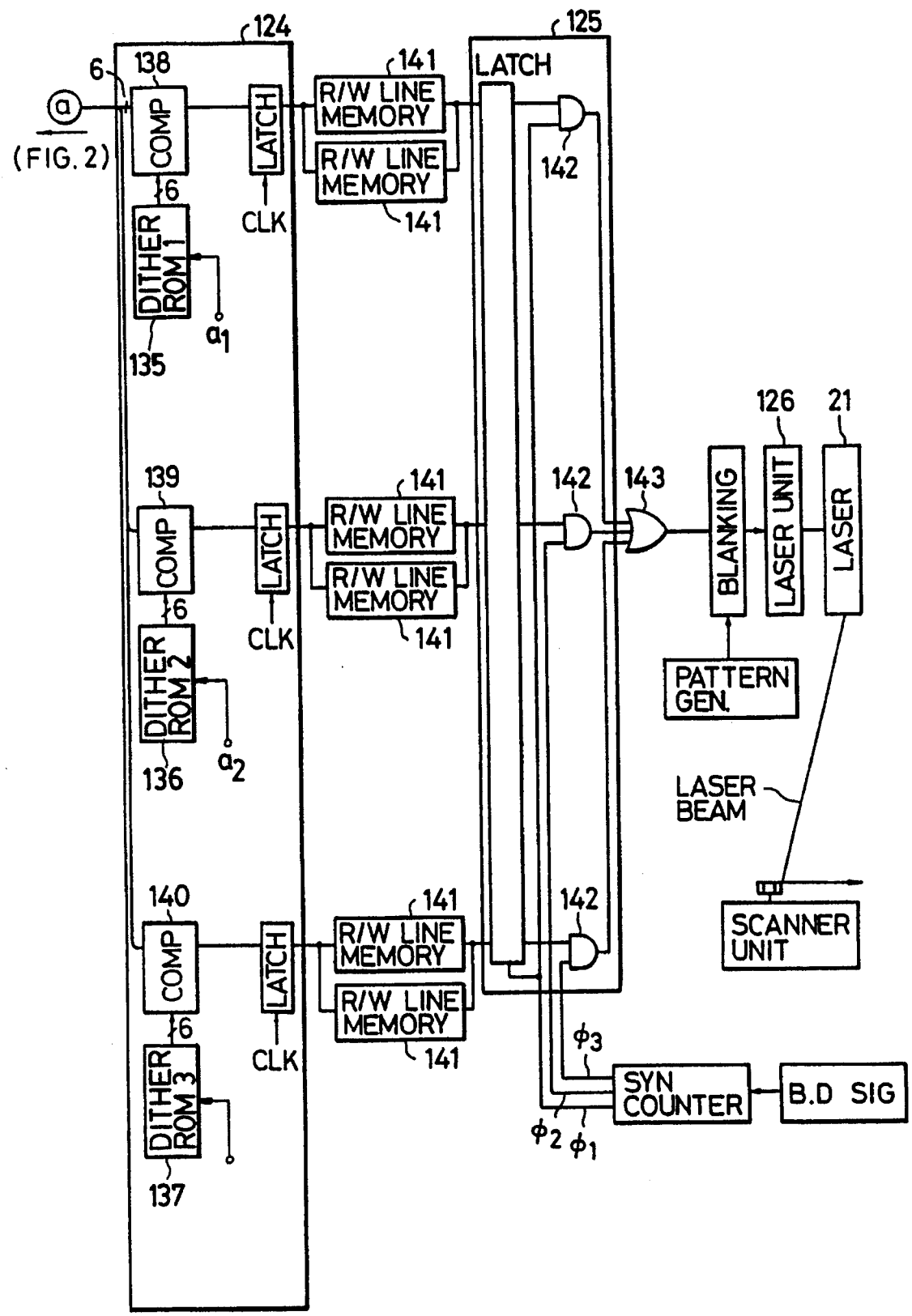
Figures 2, 3:
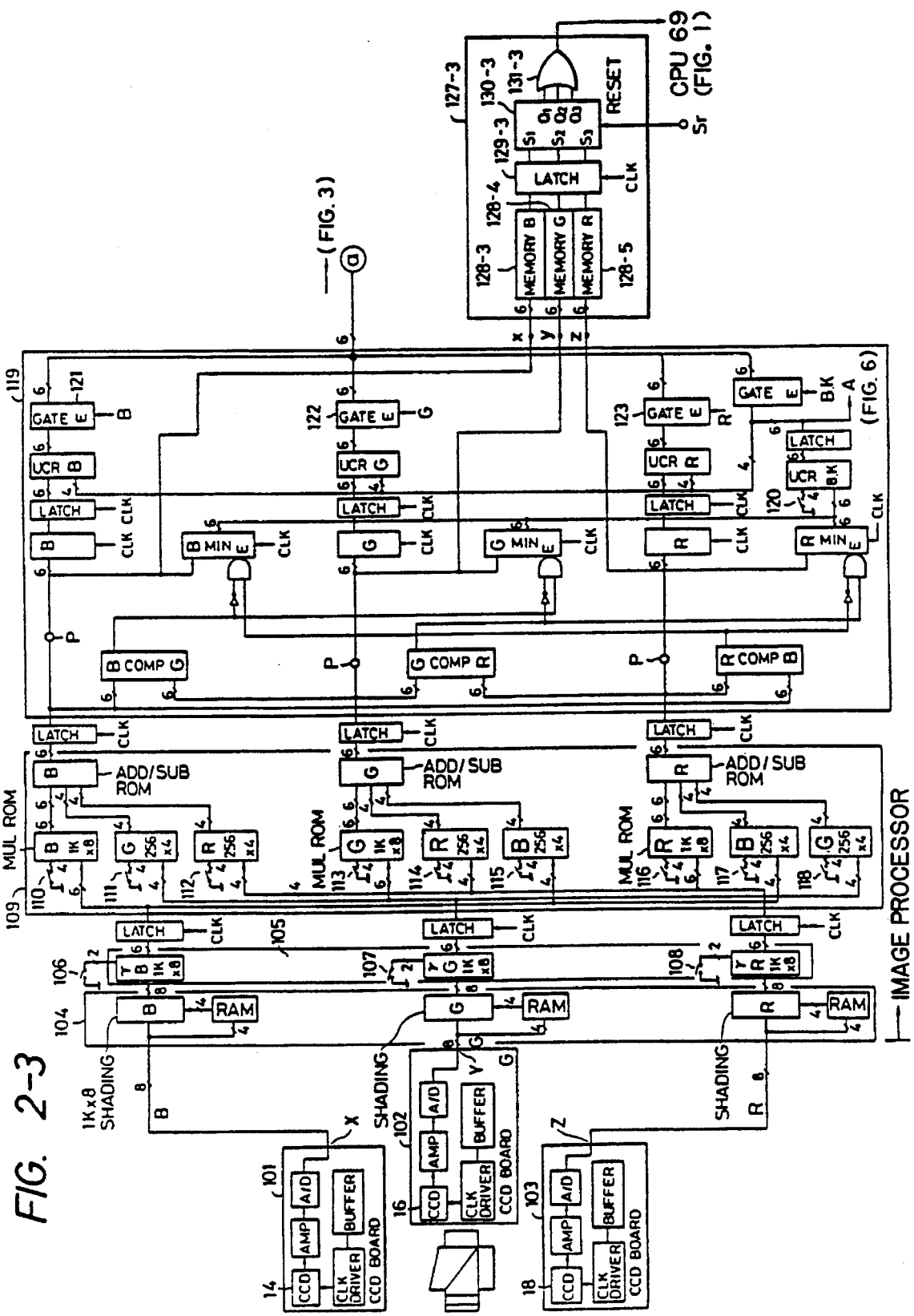
Figures 2, 3:
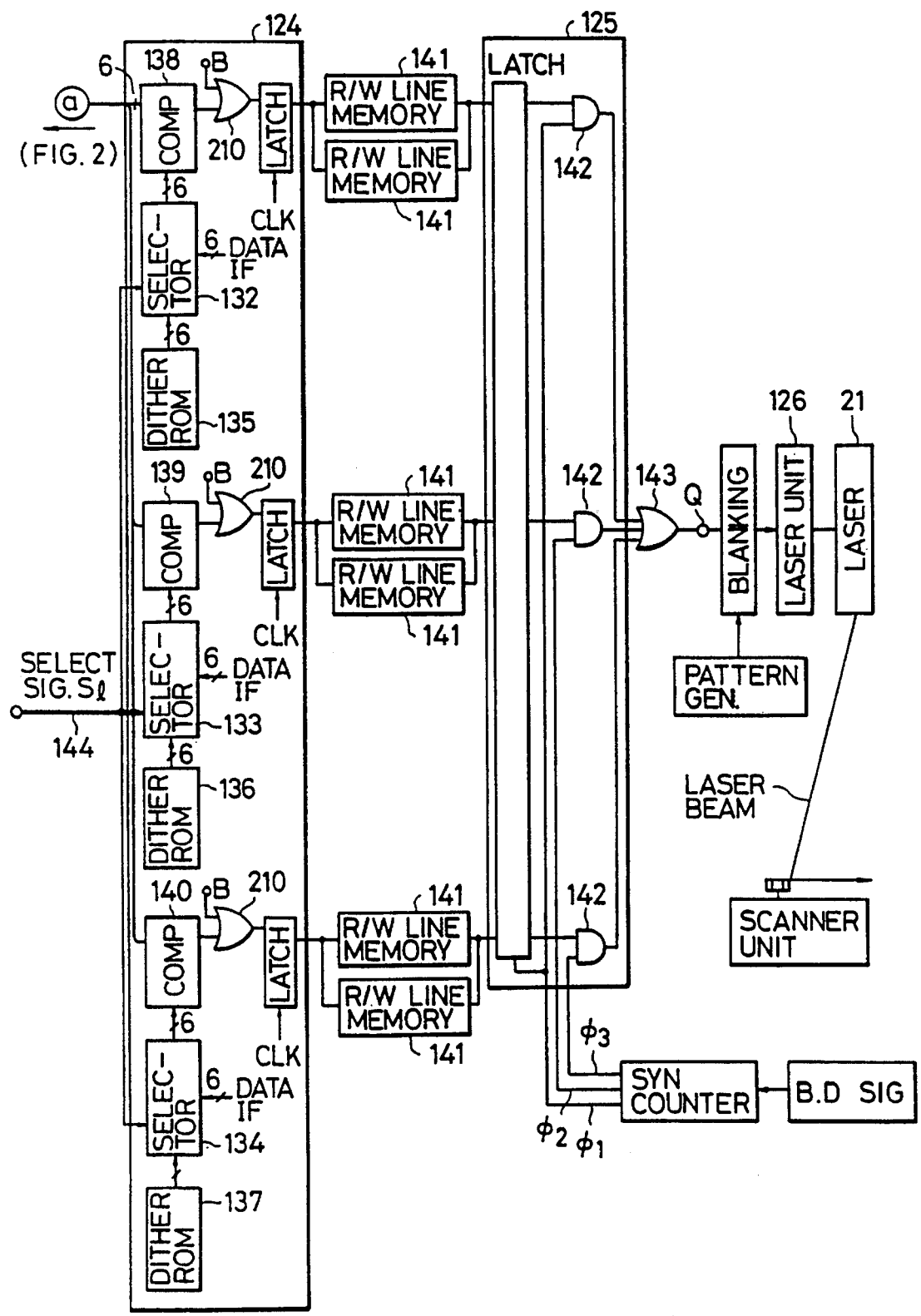

As noted FIGS. 2-1 to 2-3 and 3-1 and 3-2 show circuit diagrams of the image processor. When the lights from the original document decomposed to three color lights by the color separating prism 12 irradiate the CCD's 14, 16 and 18, the outputs therefrom are amplified by CCD boards 101, 102 and 103 (FIG. 2-1) for the respective colors, A/D-converted, and supplied to a shading unit 104 as 8-bit per pixel data. The shading unit 104 makes a correction such that when input intensities to the CCD's are equal (white), output data from respective bits of the CCD's are equal to each other and the variance among the CCD's 14, 16 and 18 is zero. The shading unit 104 comprises a RAM and a processor shading for each of the CCD boards 101, 102, and 103, and each RAM is accessed by previous 8-bit data so that the processor produces a proper output.

The γ-correction unit 105 linearizes the tonalities among input and output signals. It is provided for each color and selects an optimum γ-curve by selecting a ROM pattern by switches 106, 107 and 108. Higher order six bits of the 8-bit data are processed to produce the output data because the processing in the significant bit region is sufficient.

The signals B, G and R are processed in parallel by the masking processing unit 109 to change a mixing ratio of the respective color components to make a color correction. Thus, the signals are corrected to comply with the tones of the developing toners. The processing is carried out by a coefficient multiplication ROM (MUL ROM) for each color and an addition/subtraction ROM (ADD/SUB ROM) for each color. The mixing ratio of the color components is selected by switches 110–118. Only the higher order four bits in the significant bit region are processed. The ROM's are addressed by input data and output the processing result data. The ROM's output the data in parallel for each color.

In the UCR processing unit 119, each comparator COMP compares the color signal and a minimum signal for each of B, G and R is determined by a logical function of a gate MIN. The minimum signal from the gate MIN is multiplied by a coefficient selected by a switch 120 and a product is set as the black level signal. This is the output of the UCR BK circuit. This value is subtracted from the color signal in each UCR circuit. Thus, the black signal can be separately processed, is eliminated from the signals B, G and R, and hence a clear color image can be reproduced. One of those signals is selected by a gate circuit 121, 122 and 123 by select signals from the control unit 69 in synchronism with the color output timing, and the selected signal is supplied to the dither processing unit 124 (FIG. 3-1).

Figure 8:
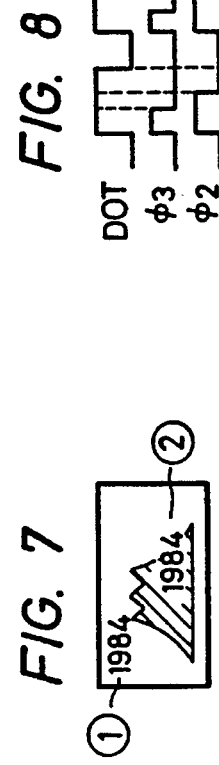
FIG. 8 shows waveforms of laser beam pulse width modulating pulses.

As shown in FIG. 3-1, in the dither processing unit 124, a dither ROM 135, 136 and 137 is accessed such that each color signal looks up in a table in accordance with the most significant bits such as the higher order six bits to binarize the input signal to a "0" or "1" signal per pixel. Alternatively, as shown in FIG. 3-1, the input data is compared with data of ROM's 135–137, which contain 4×4-matrix dither patterns, by the comparators 138–140 for each pixel to convert the input signal to "0" or "1" bit per pixel to represent gray or half-tone levels by the 4×4 pixels. Thus, the modulation of the laser beam is facilitated. The patterns of the dither ROM's 135–137 may be any of signals a1–a3 shown in FIG. 3-1. As shown in FIG. 3-2, a selector 132, 133, 134 may be used to omit the dither processing for each color. Signal representing one document line, that is, one print line of pixel data is stored in a read/write line memory 141, which is then read out in synchronism with the signal BD. Then, it is digitized by the multi-level processing-unit 125 and the laser driver unit 126 drives the laser 21. The dither processing unit has a ROM1 which contains an array of low threshold levels, a ROM3 which contains an array of high threshold levels and a ROM2 which contains an array of intermediate threshold levels. The input signal is compared in parallel with the ROM outputs and the outputs from the comparators are latched in the line memory 141 and each pixel is divided into three portions. Each pixel data from each of the ROM1–ROM3 is sectioned by pulses $\phi_1$–$\phi_3$ (FIG. 8) of different widths by an AND gate 142 in the multi-level processing unit 125 so that pixel data of different widths are produced by an OR gate 143. The beam is thus pulse-width modulated by four-value outputs to represent each pixel. In this manner, a gray level can be represented by one pixel. The processing of FIGS. 2-1, 2-2, and 3-1 or 3-2 is carried out in real time substantially simultaneously with the input of X, Y and Z signals. Thus, the print operation is started substantially simultaneously with the document scan and the color print time is reduced. By using the 4×4 matrix to reproduce the gray levels by the binary dither method, 16 gray levels can be reproduced. Since four gray levels are obtained by the pulse width modulation, a total of 64 gray levels can be reproduced.

The outputs of the UCR ROM's for B, G and R are supplied to a black signal discrimination circuit 127-1 of FIG. 2-2. The circuit 127-1 may be substituted by a circuit 127-2 through inputs U, V and W of FIG. 2-1. Higher order 4 bits of the 6-bit signal are supplied to the circuit 127-1 so that less significant bits are ignored.

Figures 1, 4:
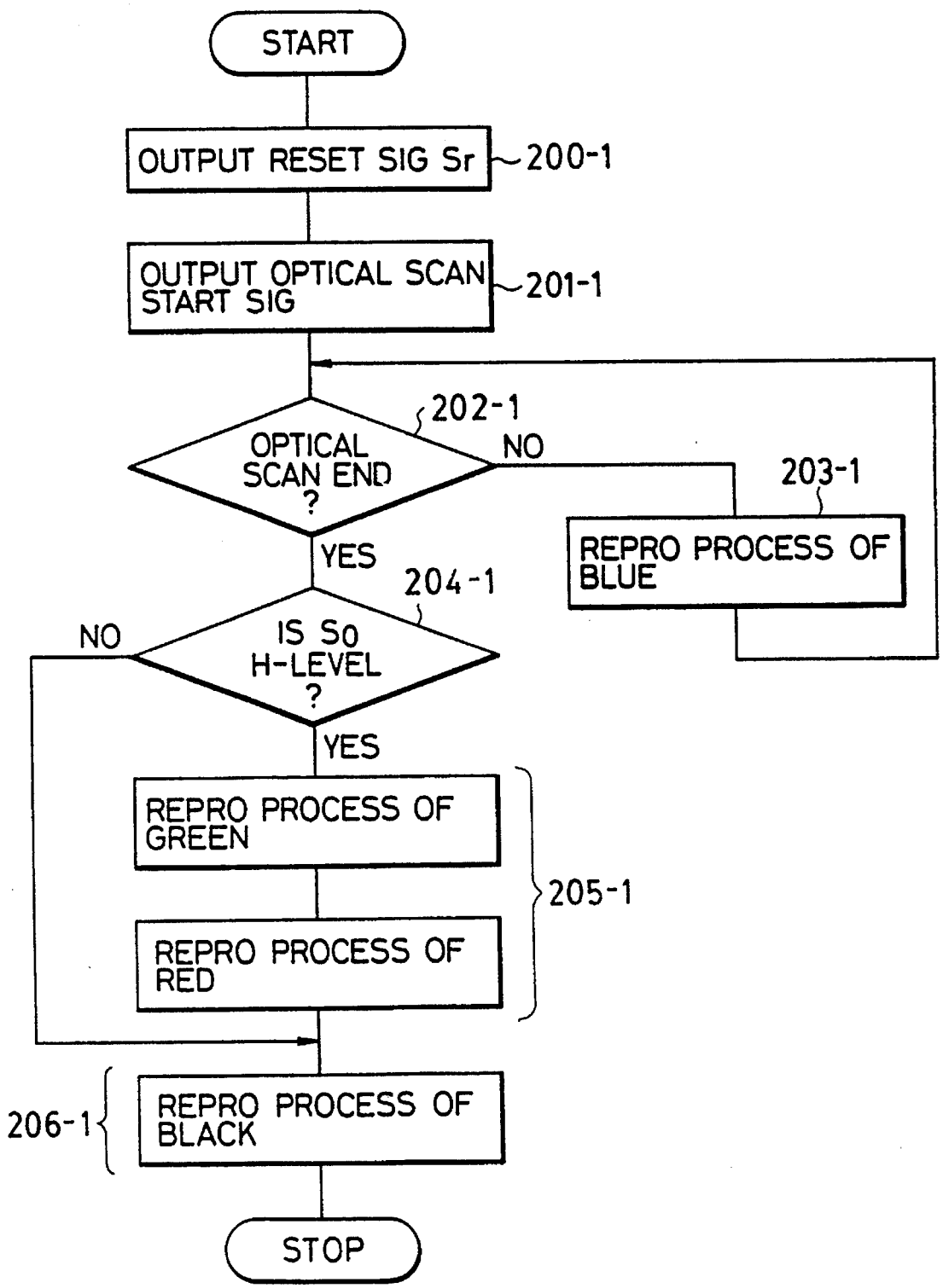
Figures 2, 4:
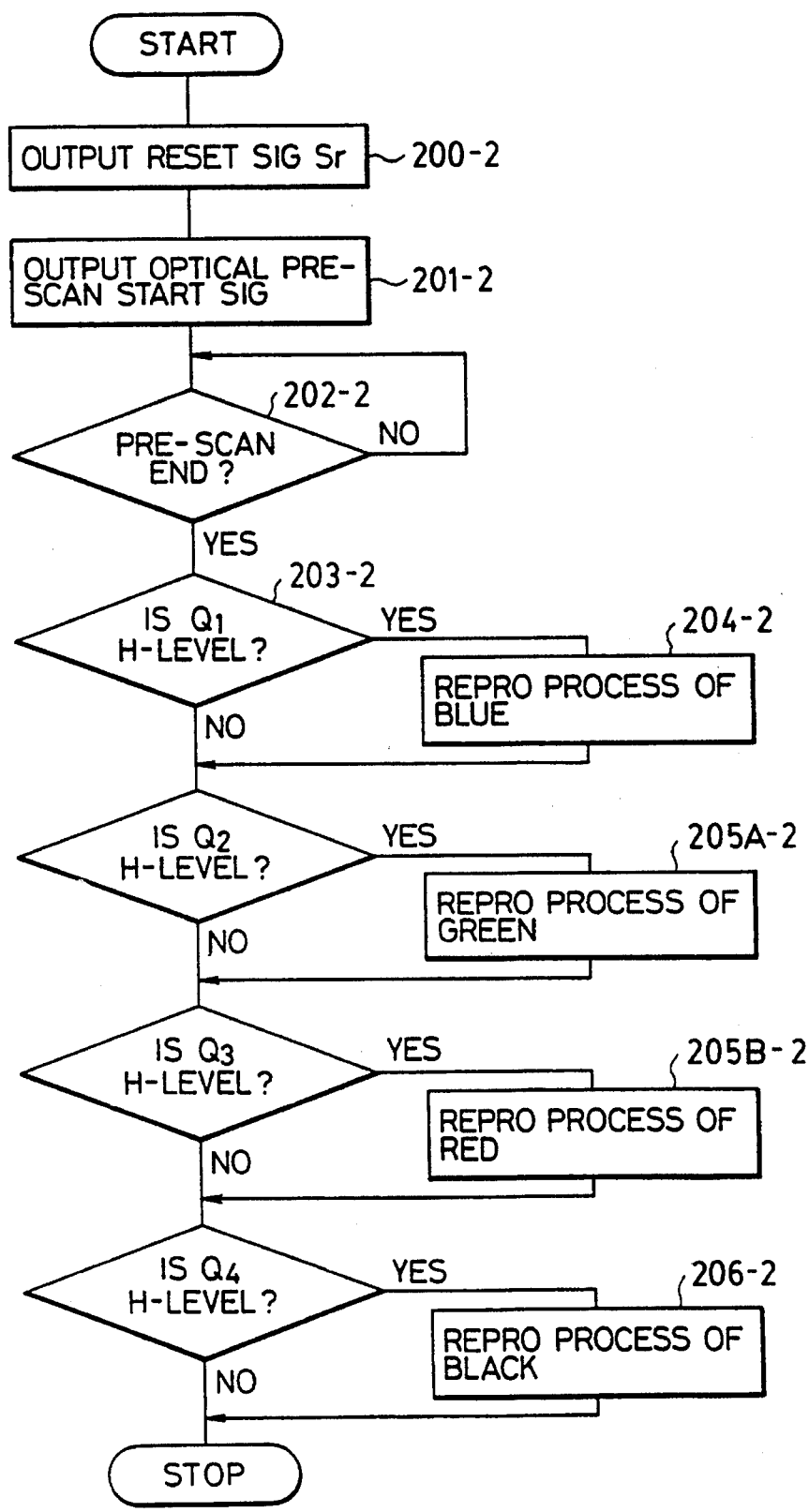
Figures 3, 4:
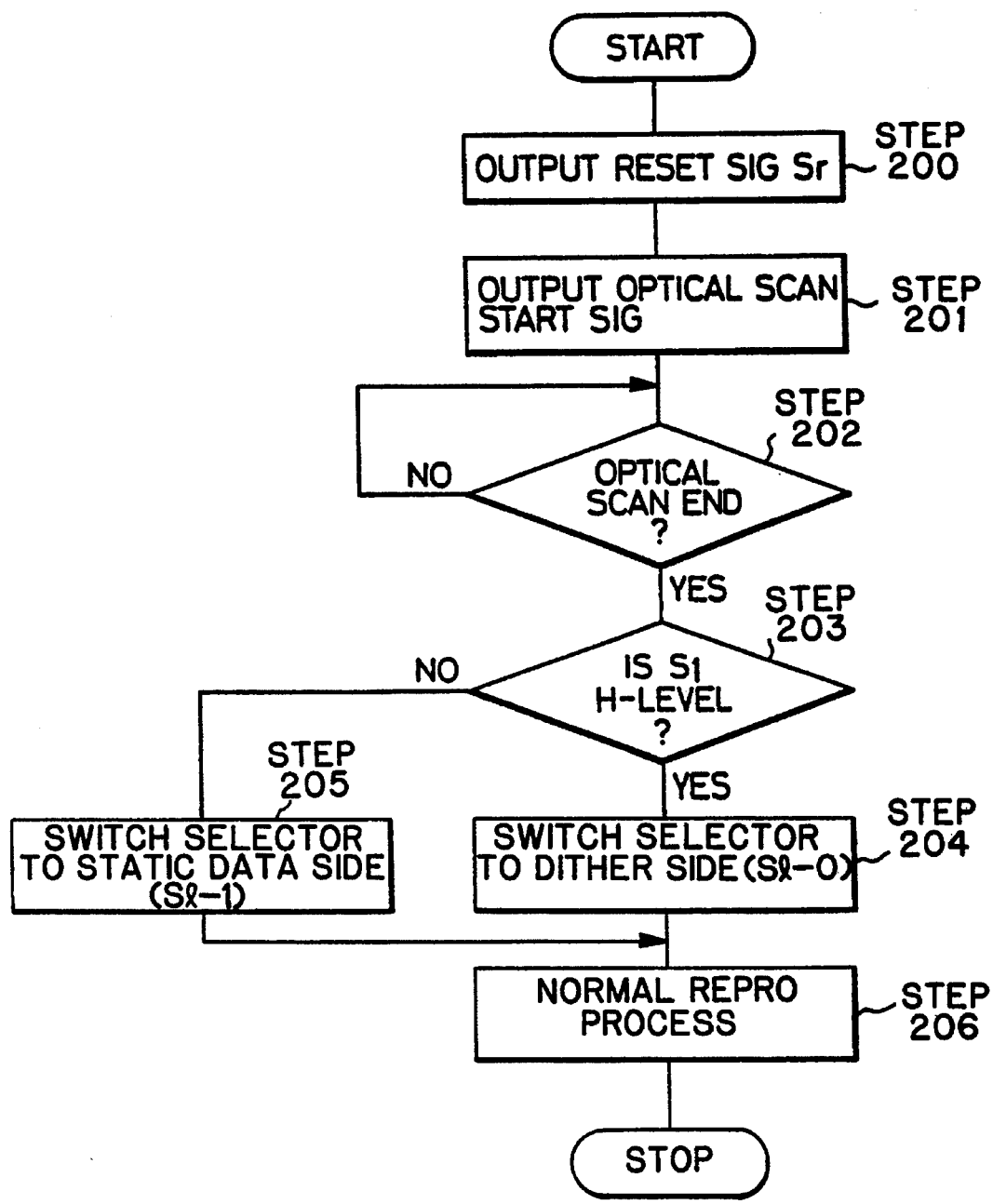

In a memory 128-1 (FIG. 2-2), "0" is stored at an address 000 and "F's" are stored at all other addresses. If the UCR signal supplied to the circuit 127-1 does not include the color signal, "0" is read out, and if the UCR signal includes the color signal, "F" is read. It is latched in a latch circuit 129-1 and the content of the latch circuit 129-1 is supplied to a hold circuit 130-1 in synchronism with a clock. The output $S_o$ is discriminated by a CPU of the control unit 69 to use it to control the sequence. This is explained with reference to flow charts of FIGS. 4-1 to 4-3.

The flow is programmed in a microcomputer of the control unit (69 in FIG. 1). A reset signal S is produced immediately before the optical scan (step 200-1) for the document scan to reset the outputs $Q_1$–$Q_4$ hold circuit 130-1 (FIG. 2-2).

If at least one color signal is included in the first run of the optical scan, the hold circuit 130-1 produces "FF" and the output $S_o$ of the OR gate 131 assumes an H-level.

The control unit 69 CPU checks (step 204-1) immediately after the end of optical scan (step 202-1), whether $S_o$ assumes a H-level and if it is an H-level signal, control unit 69 carries out a normal full color reproduction operation (routine 205-1).

If the output of the OR gate 131 remains at an L-level, the CPU determines that the document includes only black and issues a sequence select signal (step 206-1) to omit the processes for B, G and R and complete the process only for the reproduction operation of black. Thus, a sequence controller (not shown) activates only the black developing unit to form a latent image and develop it, and after one revolution of the transfer drum, release the gripper 57 to feed out the record paper.

When the scan and development processes are carried out in the order of B, G, R and BK, the processes for G and R can be omitted in the above example and hence the process time for only two colors is required.

If the document is prescanned, the color can be determined at the end of the prescan and the process time for only black is required.

If the processes are carried out in the order of B, G and R, the black latent image has been formed when the color is determined (at the end of the scan). Thus, the subsequent processes can be stopped and the process time for only one color is required.

When the input image includes only one non-black color image, that is, one of B, G, R, Y, M and C, the sequences and the signal processing can be omitted in the same manner. This is attained by independently monitoring the outputs B, G and R of the UCR unit 119 and detecting that one of them has zero output.

On the other hand, the ROM outputs of the UCR unit 119 for B, G and R may be supplied to a monochromatic signal discrimination circuit 127-2. Higher order 4 bits of the 6-bit signal are supplied to the circuit 127-2 to ignore the less significant bits.

An OR gate 128-2 for each color and black produces an L-level output when the UCR signal supplied to the circuit 127-2 includes no color signal and produces an H-level signal when the color signal is included. The signal is latched in a latch circuit 129-2 and the latched signal is supplied to a hold circuit 130-2 in synchronism with a clock. The control unit 69 CPU discriminates the output of the hold circuit 130-2 to control the sequence. This is explained with reference to a flow chart of FIG. 4-2.

The flow chart is programmed in a microprocessor of the control unit CPU (69 in FIG. 1), and a reset signal is produced immediately before the optical scan for the document scan to reset the outputs $Q_1-Q_4$ of the hold circuit 130-2 (step 200-2). Then, pre-scan is performed to illuminate the original document (step 201-2).

If at least one color signal is included before the end of the prescan (step 202-2), the hold circuit 130-2 produces an H-level signal at an output terminal corresponding to the color signal. For example, when the document include the color B, the terminal. $Q_1$ is H and the terminals $Q_2-Q_4$ are L.

The control circuit (69 in FIG. 1) checks the signal immediately before the optical scan for the color reproduction (step 203-2) and if the signal is H, it reproduces the corresponding color (step 204-2). For example, if the document includes the blue color only, it produces a sequence select signal so that the reproduction processes for green G, red R and black Bk are omitted and the reproduction process for only blue B is carried out. Thus, a sequence controller, not shown, activates only the blue developing unit to form a blue latent image and develop it, and the blue image is transferred to a record paper on the transfer drum. After one revolution of the transfer drum, the gripper 57 is released and the record paper is fed out.

When the scan and developing processes are carried out in the order of B, G, R and BK, the process cycles for G, R and BK can be omitted in the above example and the process time for only one color is required.

The main scan may be carried out in the steps 201-2 and 202-2. If the blue monochromatic image is determined at the end of the scan, the blue latent image has been formed by that time and the subsequent processes are stopped. Thus, the process time for only one color is required.

If the document includes only two colors, for example B and G, the reproduction processes for red R and black Bk can be omitted in the same manner.

For a full color document, all of the outputs $Q_1-Q_4$ are H and all of the steps 204-2 through 206-2 are carried out.

In an apparatus which forms four color images on the photosensitive drum and sequentially transfers them on one paper in registration to each other, a paper feed speed can be increased after the process for the specific color is completed so that the process time can be reduced.

The present invention is effective even when the input signals B, G, R of FIG. 2 are supplied from a host computer, and the host and the CCD reader can be switched at the connection points for signals X, Y and Z, as required. If a monochromatic command signal or black command signal is added to a head of the signal transmitted from the host, it is determined as a monochromatic image or a black image. When a 4-dot per pixel printer is used, the present invention is effective if there is a difference between the process time of the monochromatic or black process and the full color process. Further, since the full color signal processing step can be omitted, the monochromatic or black image is reproduced with a high quality.

When the monochromatic image (One of B, G, R and BK) is determined, the image may be determined as a character image and the signal may bypass the dither unit so that the resolving power is not lowered. In this case, as shown in FIG. 3-1, in order to reproduce gray levels by utilizing the pulse width modulation of the laser drive signal by the four-value signal, static thresholds (three levels) may be set by signals a1–a3 for the dither ROM1–ROM3 to attain the pulse width modulation or the intensity modulation.

By checking the output of the hold circuit 130-1 or 130-2 for each line to reset it, the monochrome decision can be made line by line and the signal processing such as sequential dither processing can be selectively controlled. Such a decision may be made for every several pixels, and the partial selection control is attained at a correct synchronizing timing.

As described above, in the color system such as color copying machine, the process time is reduced to ½ to ¼ for the document including only black. The resolving power for the characters is increased. The quality of the specific color image is not lowered because unnecessary color signals are not processed.

Since unnecessary process for charging of the photosensitive drum, laser irradiation, transfer and cleaning are inhibited, unnecessary fatigue of the machine is prevented and the life of the machine is extended.

Since the image is processed after the color discrimination, the quality of the image is not deteriorated. The black image is determined depending on whether all of the UCR unit 119 outputs are at a peak level or not, or depending on whether a maximum one of the input signals B, G, R (signals after the γ-transform) or a minimum one of the signals Y, M, C (B, G, R), after the masking correction, is beyond a predetermined level or not. When the black image is discriminated, it may be considered as a line image and the dither processing may be omitted to prevent the deterioration of the resolving power. Alternatively, when the black image is discriminated, it may be checked if the black image is a line image or includes a gray level, and for the latter case, it may be dither-processed by a different pattern from that of the color image.

Referring now to FIGS. 2-3 and 3-2, discrimination of a half-tone and a half-tone processing control are explained.

The signals produced after the masking processing are supplied to a half-tone discrimination circuit 127-3. Memories 128-3, 128-4 and 128-5 each contain "0's" at addresses 00 to 0F, "1's" at addresses 10 to 2E, and "0's" at addresses 2F to 3F. Thus, if an intermediate order bit of the 6-bit data supplied to the circuit 127-3 is "1" the memory outputs "1" to indicate the presence of the half-tone. The memory is therefore accessed by six bits since 64 addresses (00–3F) are present, the data levels are classified to high, intermediate, and low levels, and the presence or absence of the half-tone is determined for each color. The 6-bit signal supplied to the memory B 128-3 changes between "00" for high intensity of light to the CCD (low density of the document) and "3F" for low intensity of light to the CCD (high density of the document), that is, assumes one of 64 different signals. As an example, let us assume that a low density signal is produced when the input data to the circuit 127-3 is between 00–0F, an intermediate density signal is produced when the data is between 10–2E, and a high density signal is produced when the data is between 2F–3F. For example, if the intermediate density signal is applied to the memory B, it produces a "1" signal and otherwise it produces a "0" signal. The signal is latched in a latch 129-3, and the latched signal is supplied to a hold circuit 130-3 in synchronism with a pixel clock. The hold circuit, holds the data until a reset signal is applied thereto. Accordingly, if the data is between 10 and 2E, an OR gate 131-3 outputs a "1" (H) signal. When a microcomputer of the control circuit 69 detects the "1" signal, it causes the dither processing of FIG. 3-2 to be carried out, but if it does not detect the "1" signal, it causes the dither processing to be omitted and binarizes the signal by a fixed threshold level. This is explained with reference to a flow chart of FIG. 4-3.

This flow chart is programmed in a ROM of the microcomputer of the control circuit 69. A reset signal $S_r$ is produced immediately before the optical scan (step 200) to reset the outputs $Q_1$–$Q_3$ of the hold circuit 130-2. The mirrors are driven to start the first optical scan. If at least one intermediate density signal appears during the scan, the hold circuit 130-3 latches the "1" signal. As a result, the OR gate 131-3 produces the "H" output S1. The control circuit 69 (FIG. 1) checks (step 203) this signal immediately after the end of the optical scan (step 202), and if it is the "H" signal, the control circuit 69 supplies a switch signal (Sl="0") to selectors 141–143 to switch the selectors to the dither ROM's 135–137 (step 204) to carry out the dither processing. If the signal S1 is "L" the control circuit 69 produces a signal g (Sl="1")to switch the selectors 132–134 (FIG. 3-2) to fixed data (1F) generator (step 205) to omit the dither processing.

Accordingly, the character image which does not include the half-tone is not dither-processed and hence the resolving power does not deteriorate. Since the half tone is checked for all color components and the image is dither-processed if at least one component includes the half-tone, a high quality of color reproduction is attained.

By prescanning the image at a high speed i.e., when there is (no image reproduction) instead of the main scan in the first run of the optical scan, the selector can be precontrolled to select the dither processing or the fixed threshold processing.

The range for discriminating the intermediate density is not limited to the addresses in the range 10–2E of the memories 128-3, 128-4, 128-5, but may be arbitrarily determined by selecting memories containing tables of different "1" and "0" patterns between 00 and 3F.

Figure 5:
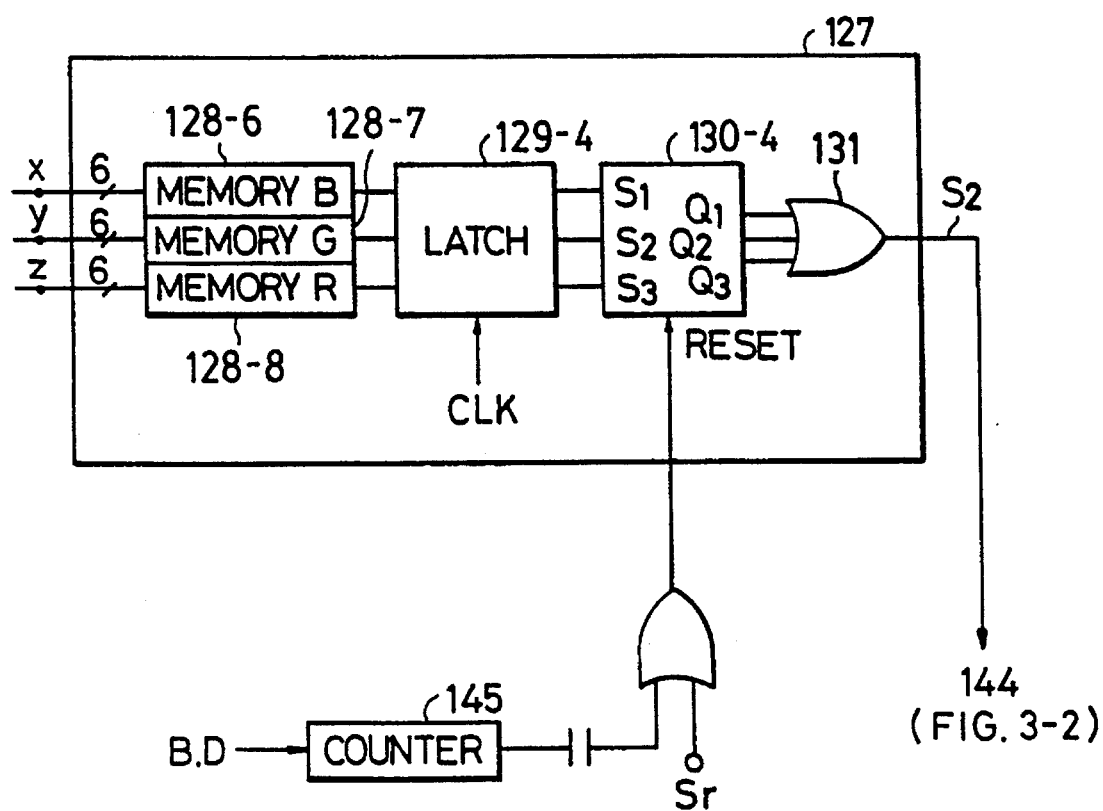

A circuit shown in FIG. 5 may be added to or substituted to receive the outputs x, y and z in FIG. 2-3. The signal BD from the beam detector 64 of FIG. 1 i.e., the (signal produced when the end of one line of beam scan is detected) is supplied to a counter 145, and when the count reaches a predetermined value (for example 4 for the 4×4 dither matrix), a reset signal is applied to the hold circuit 130-4. In this case, the signal S2 from the OR gate 131 may be supplied directly to 144 as the switch signal Sl so that the sequential dither processing is carried out if the intermediate density area is included in every fourth line. Thus, the dither threshold and the fixed threshold can be selected for every four regions. In this case, a buffer capable of storing four lines of data from the gate of FIG. 2 is provided and the output of the buffer is supplied to the dither circuit for dither processing or fixed threshold binary processing. In this manner, the half tone area and the character area can be separately processed while the document scan and the print operation are carried out in parallel. Two four-line buffers may be arranged in parallel and alternately used for half-tone discrimination and processing so that one line is dither-processed while another line is discriminated for the half-tone.

In this manner, the document including the half-tone is dither-processed to reproduce an image of high tonality, and the document including no half-tone is not dither-processed and an image of high resolution is reproduced.

The present invention is effective even if the input signals B, G and R are supplied from the host computer, and the host and the CCD can be switched at the connecting points of signals X, Y and Z as required. In this case, a command signal indicating the absence of the half-tone may be added to a head of the signal transmitted from the host and the selectors 132–134 (FIG. 3-2) may be controlled to omit the dither processing when such a command is detected. The present embodiment is also applicable to a 4-dot per pixel type printer, a thermal printer and an ink jet printer.

When the dither processing is omitted, the gray levels can be reproduced by the pulse width modulation of the laser drive signal by the four-value signal. Thus, a low gray level can be reproduced. The half-tone discrimination for several pixels is also attained, and a partial selection control with a correct synchronization is attained.

Figure 6:
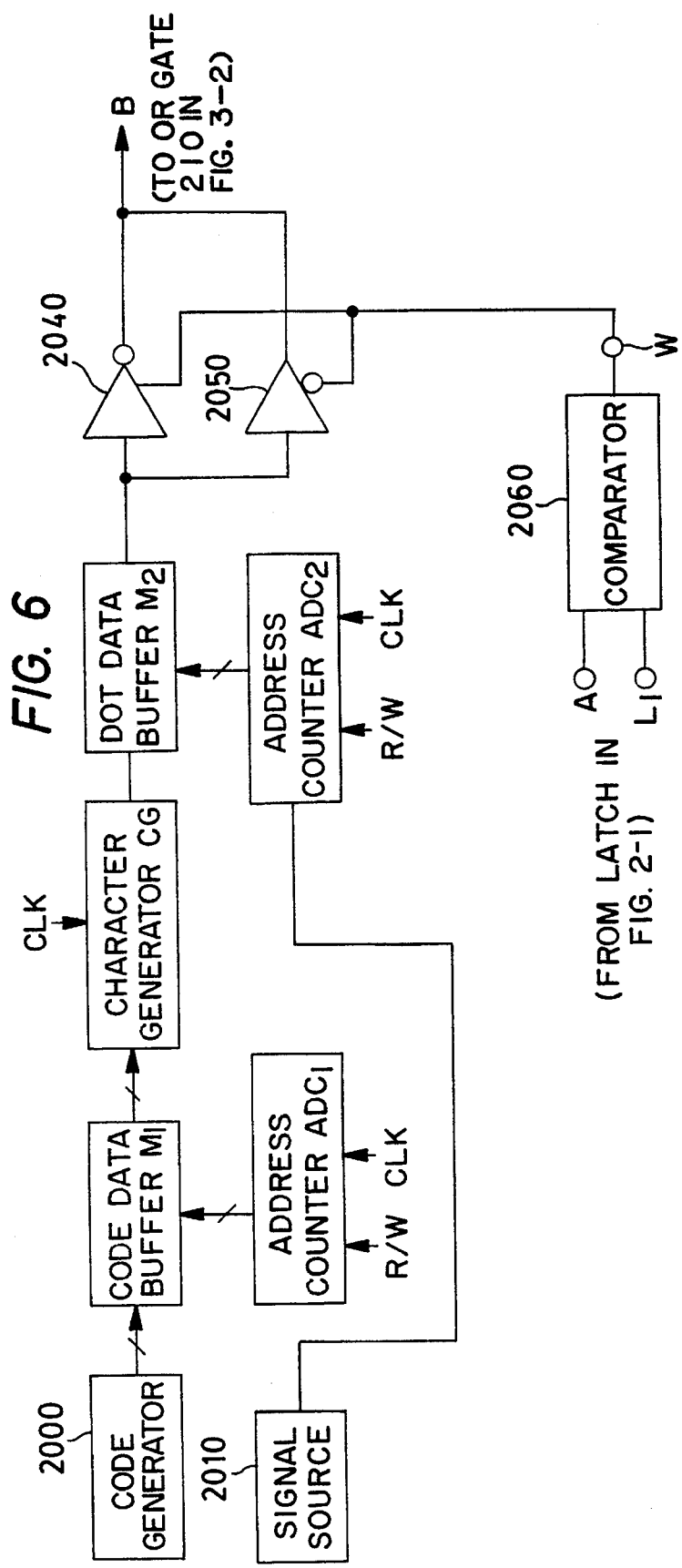

FIG. 6 shows a circuit to insert characters and numerals into the color image. Numeral 2000 denotes a code generator for generating code data (e.g. ASCII code) of a character or numeral, $M_1$ denotes a buffer memory for storing the code data when the code is generated, $ADC_1$ denotes an address counter for controlling an address to write and read to and from the memory $M_1$, CG denotes a character generator for generating a dot pattern image data of the character or numeral in accordance with the code data read from the memory $M_1$, $M_2$ denotes a buffer memory for storing the dot data from the CG. It stores the data with each pixel of the image data corresponding to one dot from the CG, that is, a dot pattern (bit pattern) of a plurality of characters and/or numerals is stored as an aggregation of the characters and/or numerals at the same spacing as that of a bit-serial data of the reproduced image. $ADC_2$ denotes an address counter for controlling an address to write and read into and from the memory $M_2$. A start of read timing of the memory $M_2$ is determined in synchronism with the processing of the color image data so that the character data superimposed position on the color image is selected. Numeral 2010 denotes a signal source for presetting the timing. When the image processing of for example FIG. 2-1 reaches preset coordinates X, Y of 2010, the readout from the memory $M_2$ is started and the character is outputted in synchronism with the color output corresponding to the above position after the dither processing so that the character is superimposed.

Numeral 205 denotes a gate which gates the "H" (black) dot output of the CG when an output of a comparator 2060 is "L" (white, gray level), and numeral 2040 denotes an inverter which produces an "L" (white) output when the output of the comparator is "H" (black). The comparator 206 produces an "H" output when an output A of the black component in FIG. 2-1 is higher than a level $L_1$, and produces an "L" output when it is lower than $L_1$. Accordingly, when the image includes a dark background, the "H"-level character image signal B is produced to represent the character image from the CG by white in the background, and when the image includes a light tone background, the "L"-level signal B is produced to represent the character image by black. This signal B is applied to the OR gate 2010 of FIG. 3-2 and combined with the dither-processed image delta. Since the inserted character is not dither-processed, the resolving power does not deteriorate.

R/W denotes the read/write signal. The signal read from the memory $M_2$ is applied to the black scan and the black process in synchronism with the black processing step and outputted to form a black character. If the color image is a blue-only image and a red character is to be inserted, the red processing step is carried out and the read signal is applied to the memory $M_2$ in synchronism with the red processing so that the signal B is outputted during the red processing step.

The address counter $ADC_2$ Counts the dots (CLK) and the lines of the image data to determine the start timing to read from the memory $M_1$, and when the count reaches the preset value (X, Y) of 2010, it starts the reading of the memory $M_2$ in synchronism with the clock CLK. The counting of the dots (pixels) is done by counting the bits (CLK) and started by an end of line signal, and the counting of the lines is done by counting the beam detect signal BD of the laser scanner indicating the end of one line scan or the signal indicating the end of counting of one line of bits, and started for each start of processing of the color data. The processing of FIGS. 5 and 6 is also carried out in real time. Namely, the document scan and the print operation are carried out substantially in parallel while the character separation and the character combination are attained.

Figure 7:
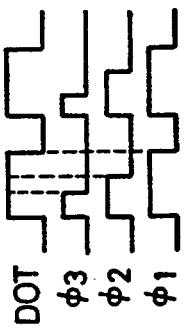
FIG. 7 shows a reproduced image.

Referring to FIG. 7, assuming that a code for "1984" is stored in the memory $M_1$ by the keys (not shown) of the control unit 145 of the copying machine of FIG. 1 or through a transmission line, the CG converts it to a dot pattern and stores it in the memory $M_2$. Thereafter, the above color data processing is enabled. (In the present example, the document scan by the optical system is allowed. The document scan is inhibited until the command indicating the absence of the insertion data is applied.) The color data processing is started, and if the number of dots and the number of lines reaches the preset coordinates X, Y of 2010 in the fourth document scan step of the black scan, the reading of the memory $M_2$ is started and the character signal B is sequentially read out in synchronism with the CLK. The signal is applied to the gate 210 of FIG. 3-2, and after the dither processing, it is combined with the data before the multi-level processing so that the black character latent image is formed on the drum. It is combined with the color image by the transfer so that a color print with characters is reproduced. Characters of other colors such as red and blue may be inserted as required.

When the characters are to be inserted into a background area having a partial dark (black) area as shown by ② in FIG. 7, the background is discriminated by the signal A (FIG. 2-1) and the white character signal B is produced. This processing is carried out in real synchronism with time the color image processing by a correctly synchronized circuit. The preset data from circuit 201 may be entered by the keys of the control unit 145 copying machine of FIG. 1 or transmitted externally. The code generator 2000 may be a ROM which contains a format including characters or scale lines.

When the background repeatedly appears at a short pitch such as a zebra pattern, it is rather an obstacle if the character is changed to white. In order to resolve this problem, a delay circuit may be inserted at a point W in FIG. 6 so that the character is changed to white only when the dark background appears over a predetermined length.

When all characters are inserted by white, it is necessary to determine the read timing of the memory $M_2$ for each color so that the above processing is carried out in each of the image processings for the four colors.

Figure 9:
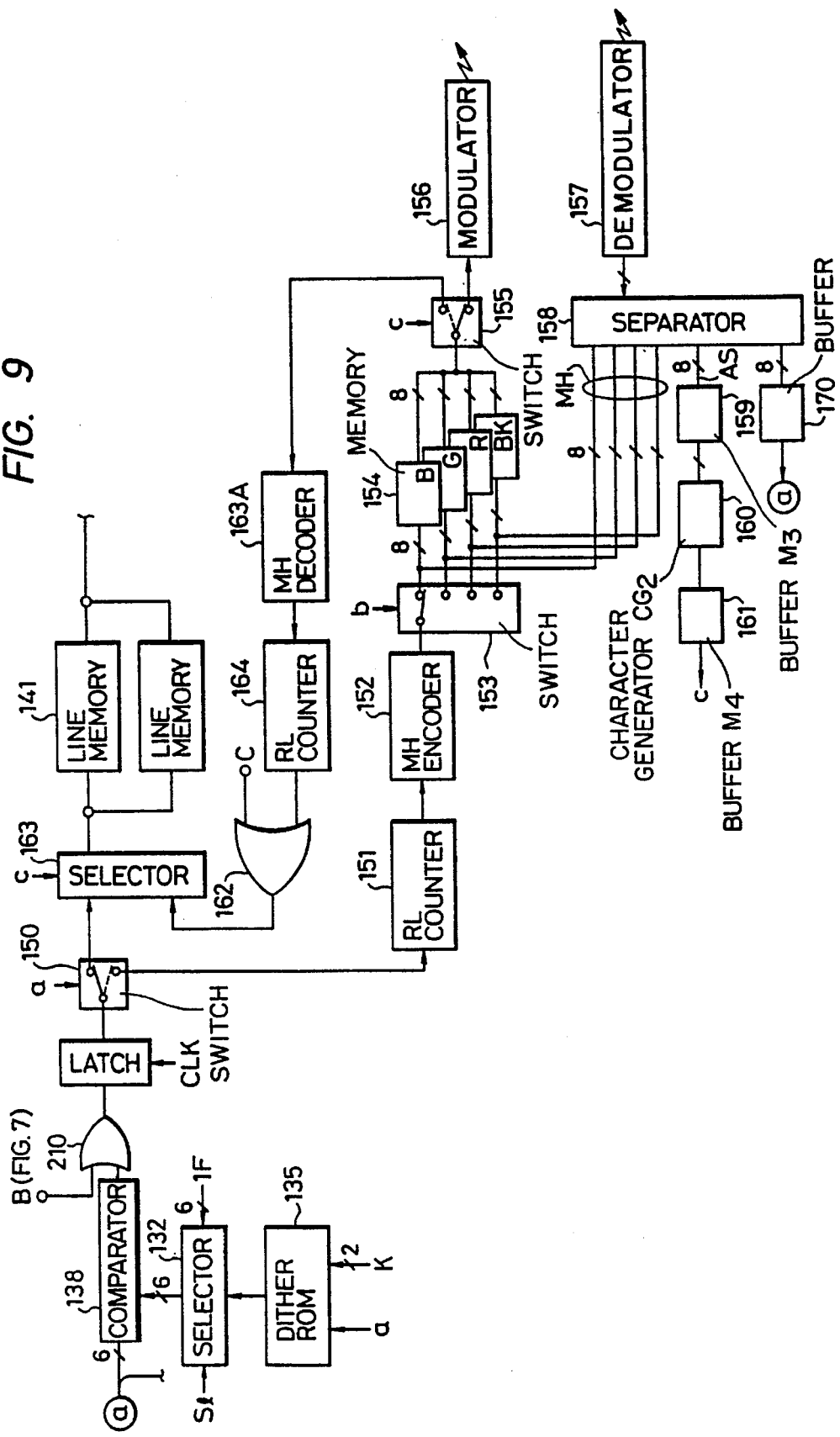
FIGS. 9–11 show other image processor circuits.

FIG. 9 shows an embodiment which transmits combined image data after binarization to another printer without multi-level processing.

The selector 132, dither ROM 135, comparator 138, OR gate 210, latch and line memory 141 are substantially the same as those shown in FIG. 3-2. However, the dither ROM 135 has a different dither pattern than the ROM of FIG. 3-2. It is selected by a signal a which is produced by a data transmission command from the key of control input unit 145 of FIG. 1. The dither pattern selected by the signal a is not a multi-level pattern but a binarization pattern so that gray levels can be reproduced without the processing by the dither ROM's 136 and 137. Accordingly, only the combined data of the output of the comparator 138 and the character signal B is transmitted, and the half-tone color combined image can be satisfactorily transmitted and reproduced.

In FIG. 9, the dither ROM 135 is set in a manner described above, and a transmission circuit is added before the line memory 141 which stores high density level data. Numeral 150 denotes a switch for switching the data transmission for printing or transmission. It is switched by the transmission command signal a to a broken line position. Numeral 151 denotes a run length counter which counts the numerals of continuous "1's" and continuous "0's" and numeral 152 denotes an MH encoder which encodes the image data in accordance with the count data from the counter 151. The counter 151 and the encoder 152 function to compress the image data. Numeral 153 denotes a switch which is sequentially switched in synchronism with the document scan of FIG. 1 and the termination of encoding by the counter 151 and the encoder 152. It is controlled by a signal b which is produced at the end of encoding of the image data of each color component. Numeral 154 denotes a memory which store the encoded color component data or transmitted color component data for each color in accordance with the switch 153. It has four memory sections for B, G, R and BK each having one document page of memory capacity. Numeral 155 denotes a switch which switches the data of the memory 154 to a transmission unit MOD or a print unit. It is switched to a broken line position by the signal c. MOD 156 is a well-known high frequency modulator. DEMOD 157 is a well-known high frequency demodulator which demodulates the transmitted high frequency signal. Numeral 158 denotes a separator which discriminates a type of the transmitted data, and when it is an MH code, produces an output on a line MH, and when it is an ASCII (hexadecimal) code, produces an output on a line AS. For the MH code, it discriminates color components B, G, R and BK and produces an output on a corresponding line. Since a command data indicating the type of data is added to a head of the transmitted data, the separator 158 selects the output line in accordance with the command data. The ASCII code is a character data which is received when the half-tone image and the character image are serially transmitted. For the MH code, after the code for B has been transmitted, the code for G is transmitted so that the respective color component data are serially transmitted. The MH data is stored in the memory 154. Numerals 159–161 denote character image generator similar to $M_1$, CG and $M_2$ of FIG. 7. They generate bit-by-bit character image data C by the character generator based on the character code. The character data C is combined with the transmitted half-tone data by the OR gate 162 in a synchronized manner as shown in FIG. 7, and the combined data is supplied to the print unit. Numerals 163A and 164 denote a well-known MH decoder and run a length counter which decode the transmitted MH code data to a bit image data. Numeral 163 denotes a selector which selects the decoded data or the document scan data to be sent to the print unit. It selects the received data by a reception signal d.

In the transmission mode, in the first document scan cycle, the color processing signal for blue is binarized by the dither circuit 124 (FIG. 3-2) so that it is converted to one-bit per pixel data. Combined data of this data and the character data is supplied to the MH encoding circuit comprising the counter 151 and the encoder 152, through the switch 150, where it is converted to an MH code of up to 36 bits, which is stored in the memory section B of the memory 154 through the switch 153. A high frequency signal is modulated by the modulator 158 with the data of the memory B and the modulated signal is transmitted. After the blue combined data has been transmitted, the red color signal is processed in a second document scan cycle, is binarized and combined, and the combined data is stored in the memory and transmitted. In this manner, the combined color data of the character image and the scan color image are sequentially transmitted in the order of B, G, R and BK for each scan cycle. The image in the scan image, which includes no half-tone image such as character image, is not dither-processed by the selector 132. Accordingly, it is transmitted while the resolving power of the CCD is preserved.

If it is determined in FIGS. 2-1 and 2-2 that the document image is a monochromatic image such as a black image, the subsequent document scan is inhibited. Accordingly, the combined data of only one color component data and the character data is stored in the memory 154 and transmitted.

The dither ROM's 135–137 (FIG. 3-2) have different dither patterns for each color to prevent deterioration of color quality. The dither pattern is selected by a 2-bit code signal K indicating the color component, which is in synchronism with the control signals B, G, R and BK supplied to the ports E of the gates 121–123 of FIGS. 2-1 and 2-3.

The received signal is separated to respective color data by the data separator 158 and stored in the corresponding color memories B, G, R, and BK of memory 154. The data is then supplied to the decoder 163A and the counter 164 through the switch 155 where it is converted to a serial bit data. The bit data is again combined with the character data as required, and it is supplied to the selector 163 and stored in the print line memory 141. Then, it is printed out by the laser beam printer. The character image C to be added may be generated by keying in a receiving system shown in FIG. 11. When the character image C to be added is transmitted in an ASCII code separately from the MH image data, the code data is separated from the MH image by the separator 158 and supplied to the character generator CG2 through the line AS, where it is converted to the dot bit image. Since the character is transmitted in the form of code, the transmission efficiency is high and to transmission rate is high. This character data and the character data of FIG. 7 include sentence information prepared by a word processor and management information such as date and time. The management information is printed outside of a print area of the document image. To this end, an output timing for the management information is preset in the address counter ADC$_2$ (FIG. 7).

When the received information is an 8-bit per pixel data which represents the gray levels by light bits, the separator 158 detects it by the command and sends the data to the buffer 170, which supplies the higher order six bits of the data to ⓐ of FIG. 9 and the dither circuit 124. This signal is binarized by the dither ROM's 135–137 (FIG. 3-2) into bit-serial image data, which are then stored in the line memory 141. In this case, the selector 163 is set to a position to send the scan image data to the print unit. The character data C is combined by the OR gate 210. The gray level data is pulse-width modulated so that the gray levels are reproduced in both digital and analog manners.

When the received image is a full color image, the address of the memory M4 is controlled such that the character code C is outputted in synchronism with the decoding of each color component code data. If a character image of a specific color is desired, the character code C is read out of the memory M4 in synchronism with the decoding of only the specific color code data.

The MOD 156 includes a converter for converting the 8-bit parallel data to the bit-serial data to allow transmission of one line of data or to allow transmission in a lineless mode, and the DEMOD 157 includes a converter for converting the received bit-serial data to the 8-bit parallel data.

Figure 10:
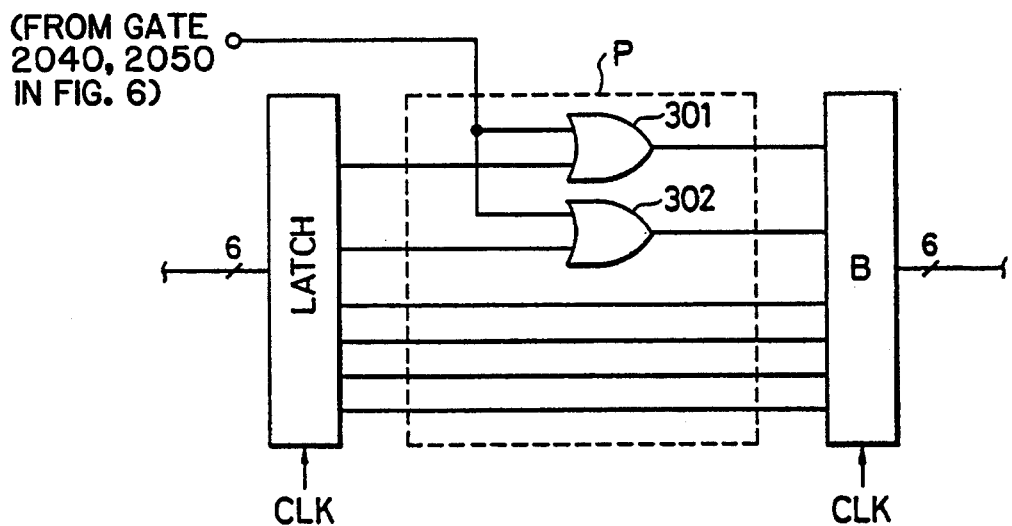

In FIG. 10, a bit signal of a character image to be combined is added prior to the half-tone discrimination of FIG. 2-3. This is attained by inserting the circuit of FIG. 9 at a point 9 in FIG. 2-3. It inserts the character signal B (FIG. 7) to the lines of higher order two bits (corresponding to 2F–3F) of the six-bit image signal supplied from the masking circuit. The half-tone discrimination circuit 127-3 discriminates if data is included in the intermediate order bits 10–2E of the six bits. Thus, the character signal inserted in 2F–3F is not detected as the half-tone indication. Accordingly, the selectors 132–134 are switched such that the data is binarized not by the dither pattern level but by the fixed threshold level. Therefore, the character signal is not dither-processed. The bit character signal B is supplied to the data lines of the higher order two bits through the OR gates 301 and 302 of FIG. 9. As a result, the insertion of the character at a high density is attained, and the resolving power of the character image does not deteriorate because the character image is not dither-processed. The latches in FIGS. 2-1 and 2-3 function to delay the data by approximately one bit period in order to synchronize the image processing. B, G and R next to the point P are also latched for delaying the data by several-bit period to one-line period.

Figure 11:
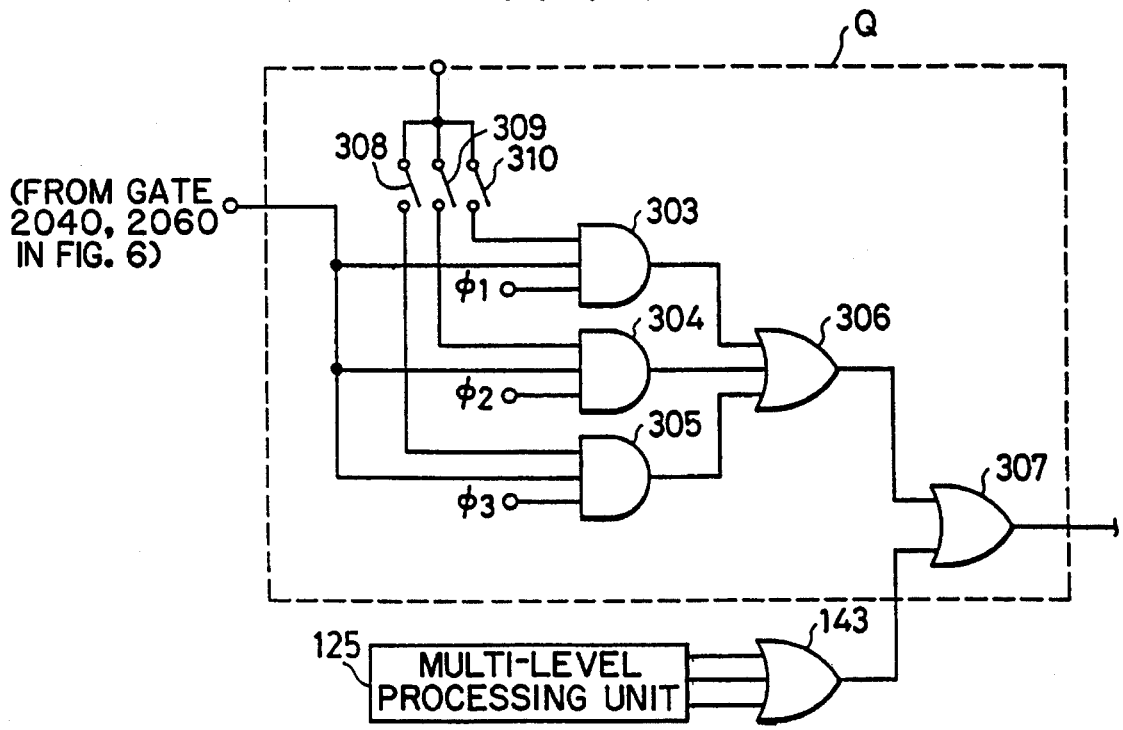

In FIG. 11, a bit signal of the character image is added after the multi-level processing of FIG. 3-2. It is attained by inserting the circuit of FIG. 10 at a point Q of FIG. 3-2. It adds the bit data B of the character image to the multi-level output, that is, the pixel data (dot data) which is pulse width modulated by the pulses φ1–φ3 of FIG. 8. In this case, by combining the signal B with the image signal in synchronism with φ1, a high density character image is inserted. When the switch 310 is turned on, the AND gate 303 which receives φ1, B and 310 produces a pulse of a basic pulse width and it is supplied to the image signal line through the gates 306 and 307. When the switch 308 is turned on, the character signal B is supplied to the image signal line in synchronism with the pulse φ3 which has a pulse width one third the pulse width of the pulse φ1. In this manner, the density of the insertion character can be selected by the switches 308–310. In this method, since the pulse width in one pixel is varied, the resolving power of the character image does not deteriorate. Since the character data is applied in synchronism with the black component or the color component, the black character or monochromatic character such as blue character can be inserted and the density thereof is controllable.

In the above embodiments, a portion of the scan image may be cancelled and a character image may be inserted at the cancelled area. This is attained by providing a data selector in place of the OR gate 210 and controlling the selector in synchronism with the address counter for each combination. If the scan image is a blue image, the cancelled area may be made white and black or other monochromatic character may be inserted therein.

In accordance with one of the above embodiments, the half-tone discrimination and the character insertion are carried out before the end of the document scan as shown in FIG. 2-3, and the print operation is started before the end of the scan. Accordingly, the reproduction time of the combined image is reduced. It is particularly convenient for the reproduction of the color image. Further, because of the real-time color processing, the memory capacity may be small.

What I claim is:

1. An image processing apparatus comprising:

input means for inputting first color image data;

coding means for coding the first color image data input by said input means so as to obtain coded first color image data having a respective plurality of coded color components;

receiving means for receiving coded second color image data from a transmission line, the coded second color image data having a respective plurality of coded color components;

separating means for separating each of the plurality of coded color components from others of the plurality of coded color components for the coded second color image data, said separating means separating on the basis of command data for each coded color component; and common memory means for storing the coded first color image data coded by said coding means and the coded second color image data received by said receiving means, wherein both of the coded first color image data and the coded second color image data are represented by the same kind of coded color components.

2. An apparatus according to claim 1, wherein said input means comprises reading means for scanning an original image to generate color image data.

3. An apparatus according to claim 1, wherein said coding means comprises counting means for counting a run length of the input data.

\* \* \* \* \*